United States Patent [19]

Gradoboev et al.

[11] Patent Number: 4,690,267
[45] Date of Patent: Sep. 1, 1987

[54] CHARGING-AND-CONVEYING MEANS

[76] Inventors: Vladimir T. Gradoboev, ulitsa Kropotkina, 120/1, kv. 86; Alexandr E. Sitnikov, ulitsa Leskova, 250, kv. 39; Alexandr M. Klimenov, ulitsa Nevelskogo, 5, kv. 45; Leonid I. Melnikov, ulitsa Dm. Donskogo, 19, kv. 19, all of Novosibirsk, U.S.S.R.

[21] Appl. No.: 796,020

[22] PCT Filed: Feb. 13, 1985

[86] PCT No.: PCT/SU85/00011
§ 371 Date: Oct. 28, 1985
§ 102(e) Date: Oct. 28, 1985

[87] PCT Pub. No.: WO85/04155
PCT Pub. Date: Sep. 26, 1985

[30] Foreign Application Priority Data

Mar. 13, 1984 [SU] U.S.S.R. .............................. 3709443

[51] Int. Cl.⁴ .............................................. B65G 47/14
[52] U.S. Cl. .................................... 198/396; 198/447; 198/625; 198/666
[58] Field of Search ............... 198/625, 663, 447, 396, 198/448, 666, 667, 550.1, 550.6, 582, 608, 669, 467.1, 662; 221/75, 222

[56] References Cited

U.S. PATENT DOCUMENTS

| 1,953,257 | 4/1934 | Peirce | 198/625 X |
| 2,336,606 | 12/1943 | Everett | 198/396 X |
| 2,966,252 | 12/1960 | Meyer | 198/448 |
| 3,791,508 | 2/1974 | Osborne et al. | 198/666 X |
| 4,526,128 | 7/1985 | Sorace et al. | 198/625 X |
| 4,527,438 | 7/1985 | Fosslein | 198/467.1 X |

FOREIGN PATENT DOCUMENTS

| 656312 | 5/1965 | Belgium | 198/669 |
| 1033134 | 6/1958 | Fed. Rep. of Germany | 198/448 |
| 52-39269 | 3/1977 | Japan | 198/669 |
| 1074056 | 6/1967 | United Kingdom | 198/448 |
| 962137 | 9/1982 | U.S.S.R. | |
| 1006339 | 3/1983 | U.S.S.R. | |

Primary Examiner—Joseph E. Valenza
Assistant Examiner—Jonathan D. Holmes
Attorney, Agent, or Firm—Fleit, Jacobson, Cohn & Price

[57] ABSTRACT

The charging-and-conveying device includes screws (5 and 6) effecting the removal of piece articles (3) from a bulk pile (2) and positioned relative to each other with their turns mutually overlapping, the screws rotating towards each other. Positioned in the overlap zone is a member (16) orienting the articles (3) being conveyed. The device further includes screws (8 and 9) having an area for accumulation of the latter. Guides (21 and 21a) are arranged along the screws (8 and 9).

4 Claims, 6 Drawing Figures

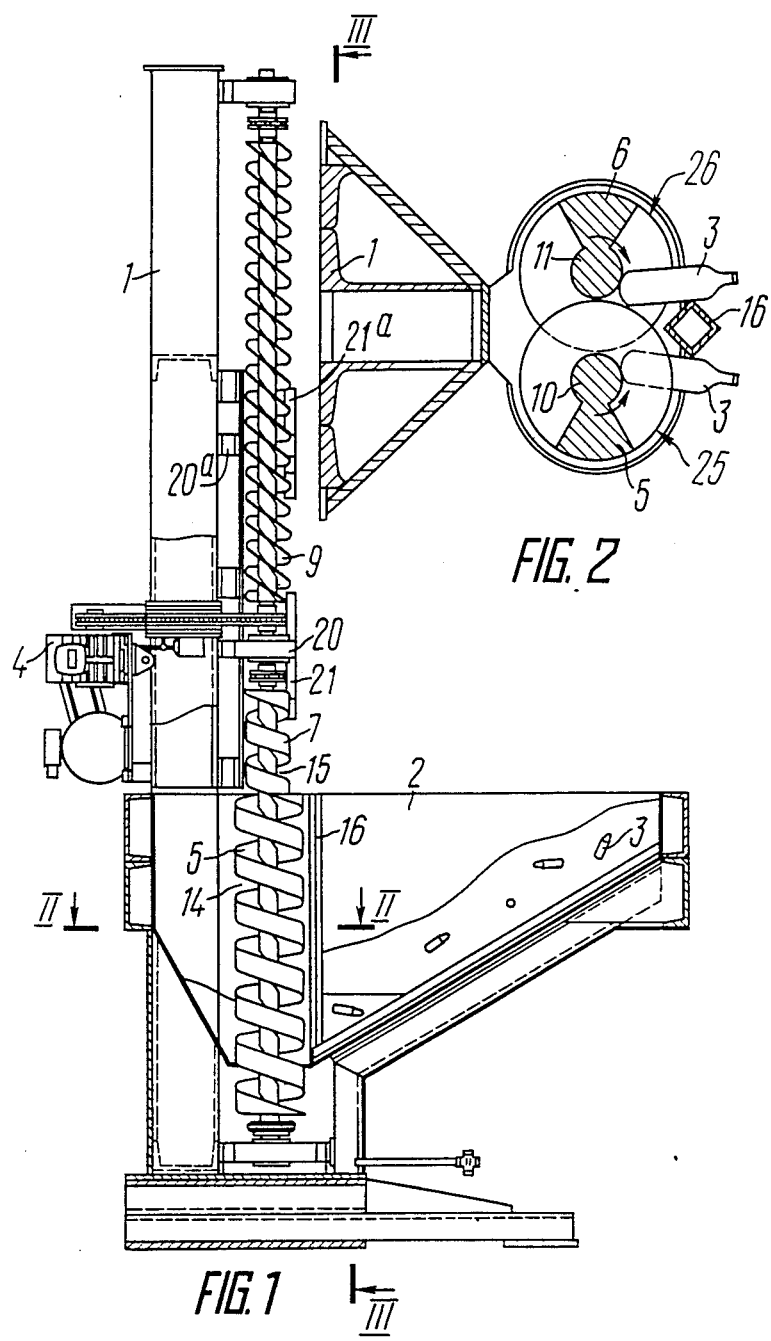

4,690,267

CHARGING-AND-CONVEYING MEANS

FIELD OF THE INVENTION

This invention relates to hoisting and transport equipment and, more particularly, it relates to charging-and-conveying means for removing piece articles from a bulk pile and conveying them to production equipment.

PRIOR ART

In mass production of articles such as bodies of revolution involving changes of their shape and length in the course of processing, it is required that the articles be removed by-the-piece from a bulk pile and, after being arranged in desired position, conveyed to subsequent production step.

By-the-piece removal of articles from a pile is effected by conventional charging means such as pocket,- vibration and elevator ones. Said means generally provide for the removal from a pile of articles of simple shape and small length of up to 150 mm with a diameter of up to 50 mm and a weight of up to 200 g.

Pocket-type and vibration charging means suffer from a high position of the hopper, required for feeding articles into charging troughs of production equipment, which makes difficult the charging of the hopper. In addition, a certain amount of articles being handled must be maintained in said prior art means for stable operation of the latter. The need for batch-feeding of articles into the hopper causes further inconvenience in operation.

Elevator charging means are free of the aforelisted disadvantages, however, said latter means fail to provide for the removal of articles of intricate shape from a pile in a strictly defined (oriented) position, this placing considerable limitations on the production capabilities of said means.

Further, in prior art charging means the parameters of devices for removing articles from a pile and of conveying devices depend strictly upon the parameters of articles being charged.

Charging means are known wherein the removal of articles from a pile and their subsequent conveyance are performed by an auger (screw). Such means, however, only provide for the charging of articles of a limited range of standard sizes.

There is known in the art a charging means protected by U.S.S.R. Inventor's Certificate No. 1,006,339, class B 65 G 33/18, published on Mar. 23, 1983. Said prior art means comprises a hopper with a casing and a discharge port, a conveying helical screw and a charging helical screw, said screws having templates with flats positioned thereinside.

The template of the charging screw is oval-shaped in cross-section while the flat of the conveying screw template is made as a concave radius recess facing the template of the charging screw to form a wedge-shaped slot, each one of the turns of the charging screw being positioned above the respective one of the turns of the conveying screw.

Said prior art means suffers from the following limitations of its capabilities.

The means is only capable of charging and conveying articles such as disks, washers, rings, flat-bottom caps and the like featuring a $1/d > 1$ ratio where 1 is the length and d is the diameter of article. Such articles are stable on the turns of the screw because they are positioned with their flat part on the turns; in so doing, the articles are held on the screw turns owing to the force of friction exceeding the centrifugal force. The sleeve-type articles with the $1/d > 1$ ratio are less stable in the vertical position and are placed with their cylindrical part on the screw turns, however, due to a small area of contact, the force of friction proves inadequate for holding the article on the screw turn and the centrifugal force throws the article off the turn, which disturbs the operation of the means.

Moreover, in said prior art means the distance between adjacent turns (width of groove) of the charging screw must be less than two thicknesses in the case of plane articles or less than two diameters in the case of articles such as bodies of revolution with a $1/d > 1$ ratio. Such conditions reduce the probability of capturing piece articles from a pile, with the prior art means being incapable of charging lengthy articles featuring a $1/d > 6$ ratio because such articles positioned vertically along the capturing screw form a stable bridge precluding their capture.

Said latter prior art means further suffers from low efficiency restricted by the speed of rotation of the screws which cannot be increased because of the following reason. When in operation, the screws of the prior art means rotate in one direction and, upon the transfer of article from a turn of the charging screw to a respective turn of the conveying screw, the article in the points of contact with the turns of the screws is acted upon by forces directed in opposite directions. This pair of forces increases with the speed of rotation of the screws to impart rotation to the article, thereby rendering unstable the position of the latter and causing it to fall back into the hopper.

Furthermore, the removal of piece article from a pile is effected by the charging screw alone while the conveying screw takes no part in this operation, which likewise affects the efficiency.

DISCLOSURE OF THE INVENTION

The present invention is aimed at solving the problem of developing a charging-and-conveying means with such a structural embodiment of the system of screws that would provide for the removal from a pile of piece articles in a wide range of standard sizes and diverse surface shapes while ensuring a substantial increase in efficiency.

The problem of the invention is solved owing to the fact that in a charging-and-conveying means comprising a hopper for piece articles placed in bulk and a system of synchronously operating screws providing for by-the-piece removal of articles from the bulk pile and their subsequent conveyance along members restricting the degree of their freedom, according to the invention, screws effecting the removal of articles from the pile are positioned relative to each other with their turns mutually overlapping, said screws rotating towards each other while in the overlap zone there is positioned one of said members orienting the articles being conveyed, while conveying screws have an area for the accumulation of removed articles, with guides arranged along said screws.

It is expedient that the area for the accumulation of removed articles be fashioned as a length of screw mated with one of the screws for removing articles and positioned in parallel with the conveying screw; in so doing, the turns of said screws must not overlap.

The conveying screws can be made sectional, with the beginning of a subsequent section being positioned next to the end of a preceding section.

In so doing, it is necessary that the conveying screws be made with a number of starts equal to the sum of the numbers of starts of all the screws removing articles from the bulk pile.

Such a structural embodiment of the invention provides for expanding the technological capabilities of the herein disclosed means and for increasing the efficiency by using a system of screws for removing articles of any shape and size from a bulk pile and feeding them through any height.

The present invention resides essentially in the following. The use of screws effecting the removal of articles from a pile and positioned with their turns overlapping relative to each other enables one to provide "pockets" formed by axial shafts of the screws, adjacent turns, end surface of the opposite screw and the member restricting the degree of freedom of article. Such pockets may have different dimensions of accommodate from two to ten articles, thereby ensuring the capture of articles from a pile and precluding the formation of a bridge. In addition, large size of "pockets" provides for the removal of articles of any shape from a pile. In so doing, when removing several articles from a pile, thanks to the overlapping of screw turns, an article coming in contact with one of the screw turns, its axial shaft, side surface of a turn of the adjacent screw and the member restricting the degree of freedom of the article dumps the other articles in the "pocket" and takes a stable oriented position in the latter. Such "behavior" of the article provides for the filling of all "pockets" coming in contact with articles placed in bulk in the hopper, which increases considerably the efficiency of the means.

The arrangement of the member orienting the articles being conveyed in the zone of overlap of the screw turns provides for placing the articles in a preset position and making them ready for transfer to the conveying screws.

The rotation of screws towards each other likewise increases the efficiency because, upon such rotation, screw portions in contact with articles placed in bulk in the hopper participate equally in the charging process. While so doing, the articles coming in contact with both screws are simultaneously affected by forces acting in the same direction, in the direction of the maximum overlap of screw turns, and making for the capture of articles by the "pockets"; said forces increase with the speed of rotation of the screws, this precluding the possibility of the articles falling out of the "pockets".

The embodiment of the accumulation area as a screw length provides for the most efficient transfer of articles from the screw removing the articles from a pile to the conveying screw, with the increase of the speed of rotation of the screws having no effect upon the reliability of transfer, which ensures the transfer of all articles delivered in the "pockets" to the conveying screw.

An increase of the number of grooves on screws removing the articles provides for an increase of the efficiency of the means without varying the speed of rotation of the screws and, in so doing, the number of grooves of the conveying screw equal to the total number of grooves of all screws removing the articles makes for the conveyance of all removed articles.

The sectional embodiment of the conveying screws and their arrangement such that the beginning of a subsequent section be positioned next to the end of a preceding section makes for a greater height of lifting articles while facilitating the manufacture of screws in view of their small length which, in turn, facilitates their assembly in the means.

BRIEF DESCRIPTION OF DRAWINGS

Presented hereinbelow is a detailed description of an exemplary specific embodiment of the present invention with due references to the accompanying drawings in which:

FIG. 1 is a general view of the herein disclosed charging-and-conveying means;

FIG. 2 is a section taken on the line II—II of FIG. 1;

Figures 3, 4:
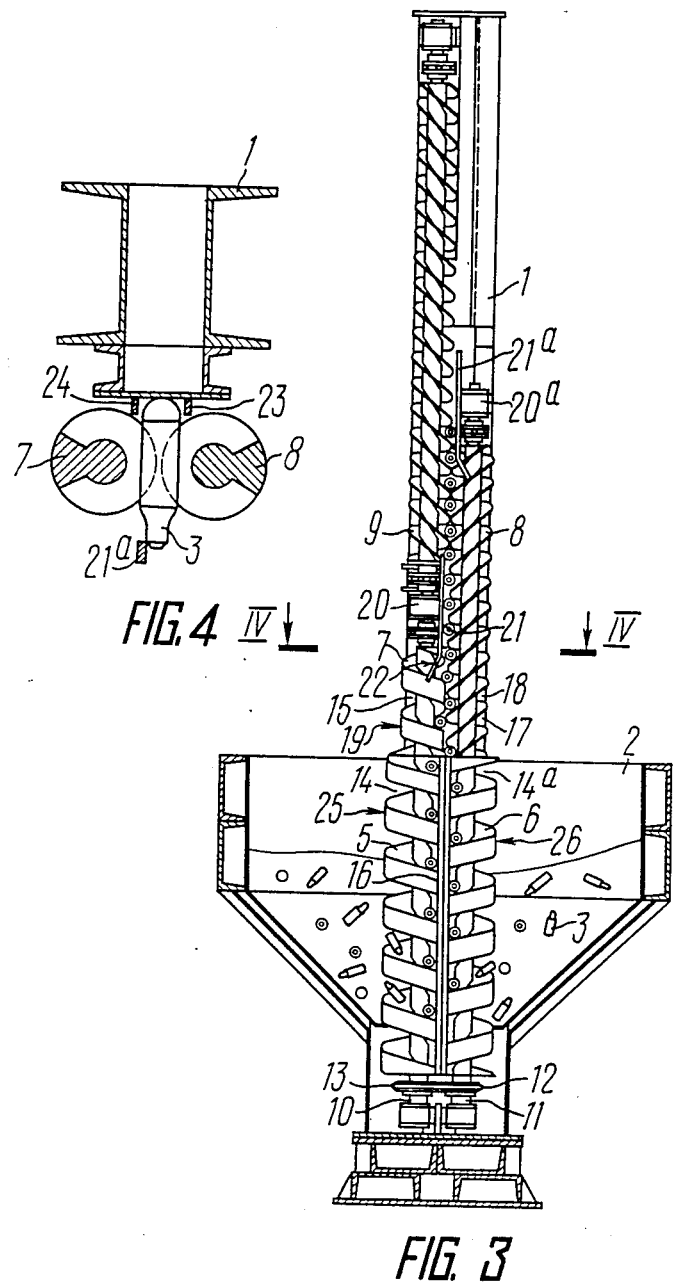
FIG. 3 is a section taken on the line III—III of FIG. 1.
FIG. 4 is a section taken on the line IV—IV of FIG. 3.

The herein disclosed charging-and-conveying means is designed for removing from a pile and conveying piece articles, mainly, articles having the shape of bodies of revolution, for example, articles such as gas cylinders for siphons.

Referring now to FIGS. 1 and 2 of the accompanying drawings, the herein disclosed means comprises a vertical rack 1 to which there is attached a hopper 2 for piece articles 3 piled in bulk therein, and a drive 4.

Positioned in the hopper 2 along the rack 1 (FIG. 3) are screws 5 and 6 for removing the articles 3 from the pile while above the hopper there are arranged a screw length 7 and screws 8 and 9 effecting the conveyance of the articles 3.

Set on shafts 10 and 11 of the screws 5 and 6 in their bottom portion are gears 12 and 13 meshing with each other and providing for synchronous rotation of the screws towards each other.

The screws 5 and 6 are made single-threaded, with opposite coiling of their turns but with similar grooves 14 and 14a whose width is equal to the thickness of their turns, the screws being mounted such that the turns of one screw enter the grooves of the other screw with minimum clearance to form a zone of mutual overlap of the turns, while the screw length 7 has a groove 15.

Positioned in the hopper 2 along the screws 5 and 6 in the zone of overlap of their turns is a member 16 restricting the degree of freedom of the articles 3 being removed, said member being fashioned as a vertical rhombic post (FIG. 2).

For accumulating the removed articles 3, the screw 5 is rigidly connected with the screw 7, their grooves 14 and 14a smoothly mating with each other, while the screw 6 is rigidly connected with the conveying screw 8 made double-threaded.

One groove, 17, of the conveying screw 8 is the continuation of the groove 14a of the screw 6 while another groove, 18, is unmated and is designed to convey the articles 3 removed by the screw 5 and coming from the groove 15 of the screw 7.

The screw 7 and the conveying screw 8 are mounted in parallel, without mutual overlap of the turns, with a groove 17 of the conveying screw 8 positioned opposite a side surface 19 of the turn of the screw 7 while another groove, 18, is positioned opposite the groove 15 of the screw 7.

The conveying screw 9 is mounted above the screw 8, with its bottom end positioned next to the top end of the screw 8, some grooves of both screws being positioned opposite each other.

On the rack 1 there are mounted bearing assemblies 20 accommodating therein ends of the screws; in so doing, guides 21 and 21a with a chamfer 22 are attached to the bearing assemblies 20 for the articles 3 to move past the latter, and guides 23 and 24 are mounted along the rack 1 (FIG. 4).

The screws 5 and 6 can be provided with two, three and more grooves; in so doing, the number of helical grooves of the conveying screw must be equal to the sum of the grooves of the screws 5 and 6 while the number of grooves of the screw length 7 must be equal to that of the screw for removing articles from the pile mated with said screw length.

Figures 5, 6:
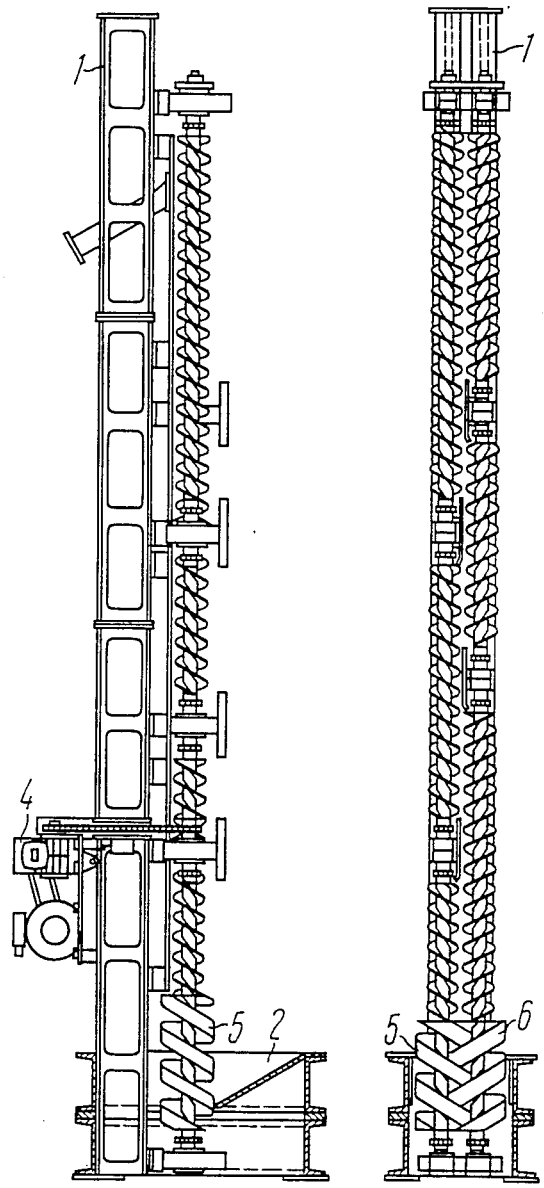
FIGS. 5 and 6 illustrate an embodiment of a charging-and-conveying means wherein articles are lifted through a considerable height.

For greater height of lifting the articles, the conveying screws can be made up of sections (as shown in FIGS. 5 and 6) positioned next to each other with the end of a preceding section being positioned above the beginning of a subsequent section. In this case, guides analogous with the guides 21 and 21a are provided for the articles to move past the bearing assemblies.

The herein disclosed means operates in the following manner.

The articles 3 (FIG. 1) are piled in bulk in the hopper 2, with part of the articles 3 (several pieces) dropping in the "pockets" (FIG. 2) formed by the grooves 14 and 15 of the screws 5 and 6, side surfaces 25 and 26 of their turns, the shafts 10 and 11 and the member 16.

The dimensions of the "pockets" allow dropping in from two to ten articles depending on the shape and size of the latter.

Upon rotation of the screws 5 and 6 towards each other, the articles 3 which dropped in the "pockets" come upwards to settle irregularly in the grooves 14 and 15, the rotating screws causing the articles to rotate and transmit rotation to each other. Said articles passing through the pile stir it softly (the stirring being done by the articles placed in part in the "pockets"), this providing continuous movement of articles positioned in the capture zone and making for the filling of the "pockets" thereby ensuring a rhythmic feed of the articles.

On leaving the pile, the article 3 (for example, the one positioned to the left of the member 16, as shown in FIGS. 2 and 3) located directly in the groove 14 and coming in contact with both screws, namely, with the shaft 10 of the screw 5, with the side surface 26 of the screw 6 and with the member 16, is urged into the "pocket" by the reaction forces of the rotating screws. Said article continues its rotation to dump adjacent articles having less points of contact with the screws 5 and 6 at the same time.

The article 3 positioned to the right of the member 16 assumes a stable position in the "pocket" in an analogous manner.

Thus, the "pockets" remain with a single article in each one of them.

The process continues in the following manner.

The article 3 positioned to the left of the member 16 and in the groove 14 of the screw 5 moves upwards to enter, in the accumulation area, the groove 15 of the screw length 7; in so doing, the article loses contact with the side surface 26 of the screw 6 and with the member 16 and, while moving forward in the direction of rotation of the screw 5, it comes in contact with the guides 23 and 24 at which moment the article 3 rolls down into the groove 18 of the conveying screw 8.

The article positioned to the right of the member 16 in the groove 14a of the screw 6 moves upwards to lose contact, in the accumulation area, with the side surface 25 of the turn of the screw 5 and, while moving forward in the direction of rotation of the screw 6, likewise comes in contact with the guides 23 and 24 while being settled in the hollow formed by the grooves 15 and 18 of the screws 7 and 8.

Upon further upward movement, the articles come, by their rear side surface, in contact with the chamfer 22 of the guide 21 shifting the articles towards the shaft 11 of the screw 8.

It is in this area that final accumulation of articles takes place, i.e., all articles are positioned in the grooves 17 and 18 of the conveying double-threaded screw 8.

As they are lifted, the articles are losing contact with the guide 21 and roll down into the hollow formed by the grooves of the screws 8 and 9.

Having thus by-passed the bearing assembly 20, the articles are transferred to the subsequent bearing assembly 20a which they by-pass in an analogous manner under the effect of the guide 21a.

On moving further upwards in the grooves of the double-threaded conveying screw 9, the articles are directed towards the discharge station (the discharge station not shown in the drawings).

The use of screws featuring mutual overlap of their turns and rotating towards each other expands the technological capabilities of the herein disclosed means by providing for the possibility of removing piece articles of any shape and size from a bulk pile while increasing the efficiency owing to the fact that both screws take part in capturing the articles.

The use of a member restricting the degree of freedom of articles and positioned in the zone of overlap of the turns of screws effecting the removal of piece articles from a bulk pile provides for the conveyance of articles in a strictly defined position, which makes for reliable transfer of articles to the accumulation area.

The provision of guides arranged along the screws enables one to make the conveying screws sectional and deliver articles to a considerable height, which expands the technological capabilities of the herein disclosed means.

Commercial Applicability

The herein disclosed means can be used most advantageously in charging and conveying devices for delivering piece articles to technological equipment used in motor building, automotive industry, machine tool manufacture, machine building. The means of the present invention can be further used in automatic lines for packing, filling and sealing flasks and other containers made of polyethylene.

We claim:

1. A charging-and-conveying means comprising
a hopper for piece articles placed in bulk therein, and
a system of synchronously operating screws providing for by-the-piece removal of the articles from the bulk pile and their subsequent conveyance along members restricting the degree of their movement,
said system including a first pair of screws positioned relative to each other with their turns mutually overlapping to effect the removal of the articles from the pile, said first pair of screws rotating towards each other, one of said members being positioned in an overlap zone of said first pair of screws and orienting the articles being conveyed by said first pair of screws, a second pair of screws effecting the continued conveyance of the articles from said first pair of screws and said second pair of screws having an area for accumulation of the articles, and guides arranged along said said second pair of screws.

2. A means as claimed in claim 1, wherein said area for accumulation of the removed articles is a screw length rigidly connected with one screw of said first pair of screws for removing the articles and said screw length is positioned in parallel with one screw of said second pair of screws and said screw length is spaced from said one screw of said second pair of screws to avoid overlapping of said one screw with said screw length.

3. A means as claimed in claim 1, wherein each screw of said second pair of screws is made with a number of grooves equal to the combined number of grooves of said first pair of screws removing the articles from the bulk pile.

4. A means as claimed in claim 1, wherein said second pair of screws are made in sections, with the beginning of a subsequent section being positioned next to the end of a preceding section.

* * * * *